May 23, 1939.   C. K. GOLDSTEIN   2,159,078
SAFETY DEVICE FOR AUTOMOTIVE VEHICLES
Filed Feb. 23, 1937   2 Sheets-Sheet 1
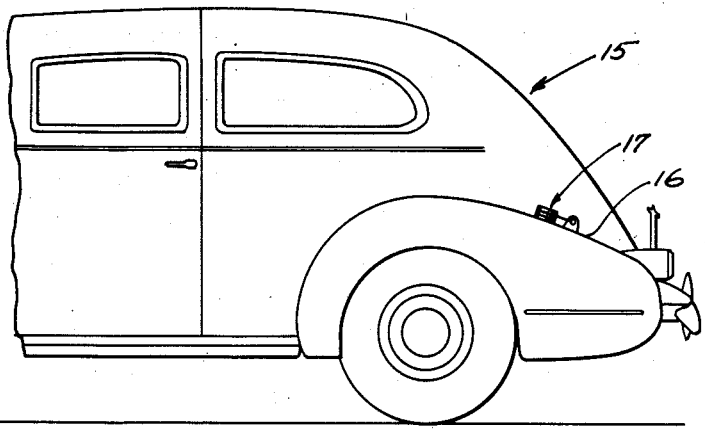
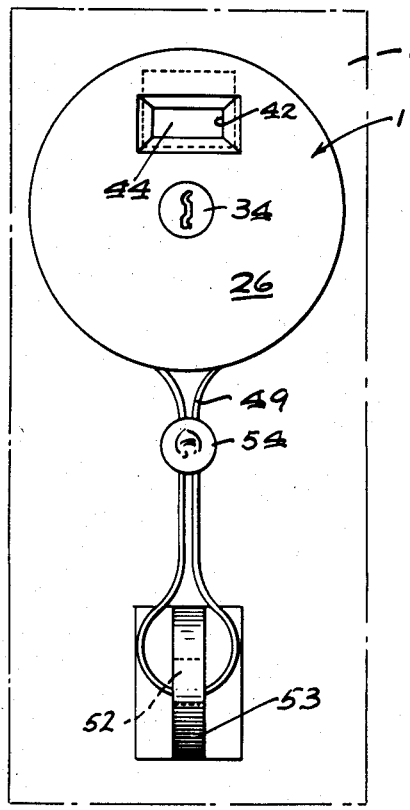
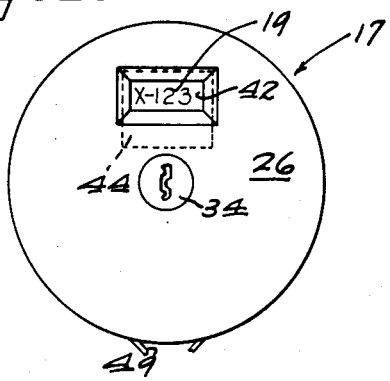
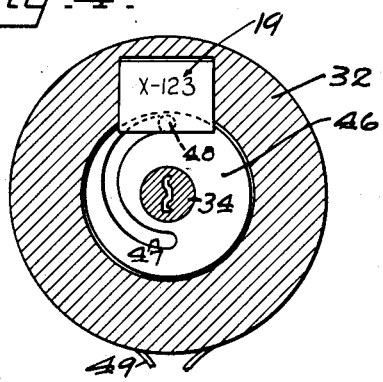
INVENTOR.
CHARLES K. GOLDSTEIN
BY George B. White
ATTORNEY.

May 23, 1939.  C. K. GOLDSTEIN  2,159,078
SAFETY DEVICE FOR AUTOMOTIVE VEHICLES
Filed Feb. 23, 1937  2 Sheets-Sheet 2
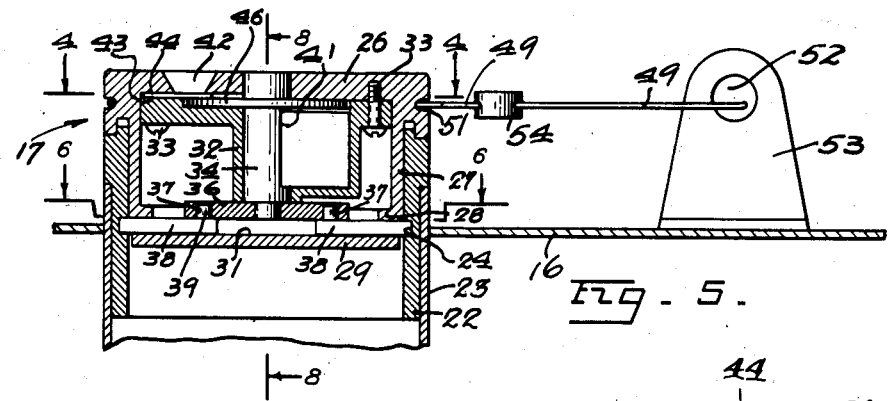
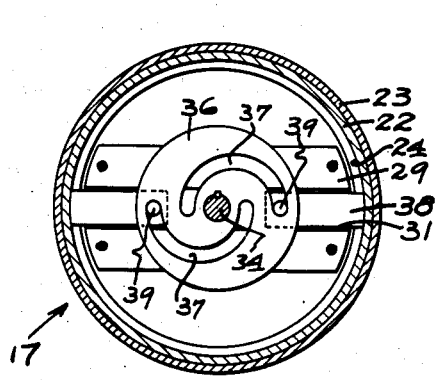
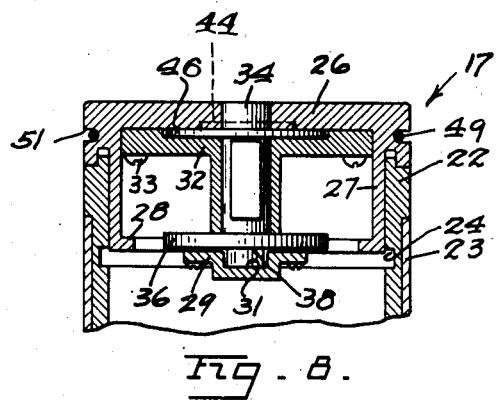
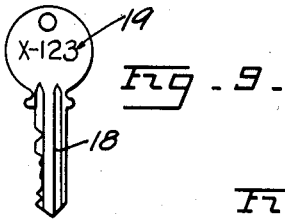
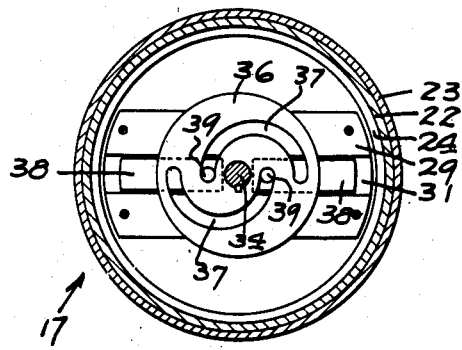
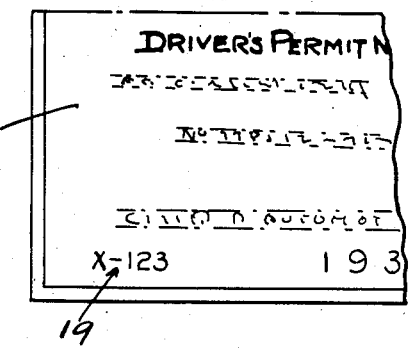
INVENTOR.
CHARLES K. GOLDSTEIN
BY George B. White
ATTORNEY.

Patented May 23, 1939

2,159,078

UNITED STATES PATENT OFFICE 2,159,078

SAFETY DEVICE FOR AUTOMOTIVE VEHICLES

Charles K. Goldstein, San Francisco, Calif.

Application February 23, 1937, Serial No. 127,105

10 Claims. (Cl. 40—2.2)

This invention relates to a safety device for vehicles, and particularly to an identification device for preventing automobile thefts and the like.

Automobile thefts are on the increase and cause increasing loss to owners and insurers of automobiles. Also many crimes are committed in stolen automobiles, because that renders the detection and apprehension of the culprits very difficult. At present a stolen automobile may be driven by a thief to any distance without any possibility of identifying the car as stolen, unless for some reason the driver is accosted by a peace officer, or unless a list is broadcast to police. But an automobile can travel long distances in a comparatively short time and thus quickly leave the area wherein there is danger of being recognized.

Theft may be discouraged and long distance travel by stolen vehicles or automobiles may be positively obviated by some certain and definite identification of the fact that the automobile is driven by someone unauthorized by the owner. This can be accomplished by making it necessary and unavoidable for all drivers to identify themselves periodically, for instance at service stations to the attendant whenever service is required, in such a manner that such attendant can ascertain at a glance whether the automobile is driven by its owner or by an unauthorized person. It is difficult to enforce such identification unless the same is almost automatic and necessarily voluntary.

It is an object of the invention to provide a device whereby the identification of the authority of a driver to operate a vehicle is assured, by the exhibition of an instrumentality unavoidably necessary to the servicing or supply of the vehicle.

Particularly it is an object of the invention to provide a device which must be exposed to view at certain necessary intervals in use of a vehicle so as to be observable by a third person, and which device is indicative of ownership or authority for possession of said vehicle.

Another object of the invention is to provide a device which normally obstructs the replenishing of a supply material unavoidably necessary for the operation of a vehicle, and the opening or releasing of which obstruction involves a positive identification of the driver to the supplier of such material.

A further detailed object of the invention is to provide a fuel lock for an automotive vehicle, the opening of which renders operative an identification mark, a duplicate of which must be in possession and exhibited by the driver to the attendant or the like before the tank or container can be refilled, thereby preventing the refilling of the fuel tank in the absence of the owner or of the authorized possessor of the vehicle.

Another object of this invention is to provide a safety device for automobiles which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact details of the construction of the said parts as illustrated in the accompanying drawings.

With the foregoing and other objects in view, which will be made manifest in the following detailed description and specifically pointed out in the appended claims, reference is had to the accompanying drawings for the illustrative embodiment of the invention, wherein:

Fig. 1 is a fragmental side view of an automobile, showing my device on the fuel tank.

Fig. 2 is top plan view of my device in locked position.

Fig. 3 is a top plan view of the lock after it is opened.

Fig. 4 is a sectional view of the lock of my device, the section being taken on the line 4—4, of Fig. 5.

Fig. 5 is a cross sectional view of my device.

Fig. 6 is a sectional plan view of my device, the section being taken on the line 6—6 of Fig. 5.

Fig. 7 is a sectional plan view of my device with the lock bolts in open position.

Fig. 8 is a sectional view of my device, the section being taken on the line 8—8 of Fig. 5.

Fig. 9 is a side view of an identifying key for my lock; and

Fig. 10 is a fragmental view of a license with the identifying mark in the corner.

As an illustration my invention is shown as used in connection with the fuel tank of an automotive vehicle. The automobile 15 has a usual tank 16, on the inlet of which is mounted a locking cap 17 which when opened by a key 18 or the like, shows an identifying mark 19 which appears also on the key 18, and on the license 21 or other identifying paper of the owner of the automobile. The automobile may be driven by an unauthorized person only as far as the fuel lasts and at that point the same may be recovered, because in order that the supply of fuel be replenished the cap 17 must be removed. However an unauthorized person would not have any means to open the lock without breaking off the cap 17. Such broken cap 17 is conspicuous to any passerby or peace officers and would facilitate apprehension. If a pass key is used it is unavoidably exhibited to the attendant at the fuel pump of the service station. The attendant can notice at a glance that the key 18 does not bear the numeral or mark shown on the cap 17. Thus the attendant can put the police on the trail of the stolen automobile. In case of doubt the owner can always identify himself by the same corresponding identification mark 19 on the license 21. There may be several marked keys 18 provided and colored differently so that the owner always carries a key 18 of one distinctive color, such as red, and when the owner allows someone else to drive his automobile he can give to such authorized driver a key 18 of a different color, such as yellow. Thus identification is unavoidable before the automobile is driven to a great distance. Also in case of suspicion of stolen automobile, this device facilitates identification.

In the herein illustrative embodiment I make use of an adapter 22 fixedly secured into the usual inlet spout 23 of the fuel tank 16. The adapter 22 is in the form of a bushing and may be welded, expanded or otherwise permanently fixed into the spout 23. The adapter 22 has an annular keeper groove 24 around its inner periphery, spaced from the outer end of the adapter 22. It is to be noted that such adapter 22 is desirable to standardize the size of caps and locks, but the keeper groove 24 may be cut into the inner periphery of a suitable inlet spout 23 so as to coact with the cap and lock.

The cap 17 has a closure top 26 from which extends a hollow cylindrical casing 27 fitting into the inner periphery of the spout or of the adapter so as to prevent the escape of fuel through the inlet passage.

On inwardly extended flanges 28 on the inner end of the casing 27 is secured a cross plate 29 which latter has a recess 31 substantially diammetrical to the bottom and below the casing 27. A lock casing 32 is secured to the underside of the closure top 26 by screws 33 or the like. The lock cylinder 34 extends through the casing 32 and carries on its lower end a cam plate 36 which latter has a pair of symmetrically eccentric cam slots 37. In the recess 31 are slidably guided radial bolts 38 in alignment with the keeper groove 24 and a pin 39 extends upwardly from the inner end of each bolt 38 and into the adjacent cam slot 37. Thus when the lock cylinder 34 is turned the corresponding turning of the cam plate 36 causes the reciprocation of the bolts 38 respectively into and out of the keeper groove 24. When the lock bolts 38 are engaged with the keeper groove 24 the removal of the cap 17 from the inlet passage is positively obviated.

The lock mechanism in the cap 17 may be of any type. In the present illustration it is actuated by the key 18 which acts on certain tumblers 41 in order to turn the cylinder 34. The closure top 26 of the cap 17 has an outside opening or window 42, which may be covered by a transparent covering. Below the window 42 is a recess 43 in the top of the lock casing 32 and in this recess is slidably held an identification plate 44. The plate 44 is divided into two zones, one zone is blank, the other or outer zone bears an identification mark thereon, such as the indicia 19. When the plate 44 is pulled toward the center of the lock its marked zone is moved into registry with the window 42 and the indicia 19 becomes visible. When the plate 44 is pushed outwardly the indicia 19 are concealed from view.

The moving of the plate 44 is accomplished by a cam plate 46 keyed to the cylinder 34 and positioned in a central annular recess in the top of the lock casing 32 below the level of the plate 44. An eccentric cam slot 47 in said cam plate 46 is engaged by a pin 48 extended downwardly from the plate 44. Thus when the cylinder 34 is rotated to lock the cap 17 the plate 44 is pushed outwardly to conceal the marking or indicia 19, and when the cylinder 34 is rotated into lock opening position the cam slot 47 pulls the plate 44 centrally so as to bring the marking or indicia 19 into view opposite the window 42. In order to replace the plate 44 it is necessary to remove the cap 17 from the inlet and then remove the lock mechanism from the inside. In this manner the plate or indicia may be changed when the vehicle is transferred, or when for some reason the mark or indicia of ownership is to be changed.

It is not necessary to turn the cap 17 in order to remove it or to lock it. The cap 17 may be moved vertically on or off the tank inlet. For further assurance the cap 17 is flexibly secured to the vehicle, preferably to the tank, so as to prevent the complete removal of the cap 17 from the vehicle without breakage. For this purpose I show herein a strong but flexible spring wire loop 49 sprung over the outer periphery of the cap 17 and into the annular groove 51. The same spring wire is passed through the aperture 52 of a bracket 53 fixed on the body or tank of the vehicle. The ends of the spring wire are so located as to be near the narrower contracted part of the loop 49 where both strands of the wire can be sealed together by a suitably marked metallic seal 54. This arrangement allows the lifting of the cap 17 into an out of way position, but prevents the changing or removal of the cap 17 without breaking the continuous wire or the seal 54. Such breakage would conspicuously indicate the cap 17 has been tampered with.

The device heretofore described provides positive and complete identification through the lock plate 44, the key 18, and the license 21, all of which bear the same identifying mark or indicia 19. A stranger cannot open the lock without a key and has to abandon the automobile when out of gas. False keys or pass keys would not bear the proper number and there is no time in stealing a car to punch markers on pass keys, therefore at the first attempt to refill the tank the service station attendant will know of the theft and can notify the police. The same applies if the cap or the wire loop holder is broken. In case of misunderstanding the marking on the license provides a final identification.

Having thus described my invention what I now claim and desire to secure by Letters Patent is:

1. Means to prevent continued operation of a motor driven vehicle, which comprises, releasable means for preventing access to a supply necessary to continued operation of said motor, a lock to fasten said releasable means in a position to prevent such access to said supply, and means of identification operated by the opening of the lock so as to become observable when the lock is open.

2. The combination with the fuel inlet of the fuel container of a vehicle, of a closure member for the inlet, locking means for the closure member, a normally hidden identification member related to the locking means, and means operated by the locking means to move said identification member into view when said locking means is opened, and to move said identification member out of view when said locking means is locked.

3. The combination with the fuel inlet of the fuel container of a vehicle, of a closure member for the inlet, a lock on the closure member, to fasten the closure member in inlet covering position, and identification means operated by the opening of the lock so as to become observable only when the lock is open.

4. The combination with the fuel inlet of the fuel container of a vehicle, of a closure member for the inlet, a lock on the closure member, to fasten the closure member in inlet covering position, and identification means operated by the opening of the lock so as to become observable only when the lock is open, and a key for opening and closing said lock, said key bearing the same mark of identification as that of said identification means.

5. In an identification lock of the character described, the combination with means to open and close the lock of an element bearing an identification mark being adjustably mounted on said lock so that the identification mark is normally concealed from view, and means of connection between the actuating mechanism of the lock and said element to move said element so as to render said mark visible when the lock is opened, and to move and hold said element so as to conceal the mark when the lock is locked.

6. In an identification lock of the character described, the combination with the actuating mechanism of the lock and with an opening on the lock, of a member movable opposite said opening, an identification mark on said member so arranged as to be movable into registry with the opening by said member, and means of connection between said member and the lock actuating mechanism to move said member when the lock is locked or unlocked, so as to respectively conceal or expose said mark relatively to said opening.

7. The combination with a lock having an opening therein, of a plate in the lock slidable relatively to said opening, an identification mark on the plate so arranged as to be visible when in registry with said opening in one position of said plate and to be concealed in other positions of the plate, and means to move said plate so as to bring said mark into and out of view at said opening respectively when the lock is unfastened and fastened.

8. The combination with a lock having an opening on its casing; of a plate slidably held below said opening and bearing an identification mark thereon, said mark being concealed from view when not held by the plate in registry with said opening, a cam rotated by the operation of the lock, an engagement element on said plate being so engaged with said cam as to slide the plate so that said mark is in registry with the opening when the lock is unfastened, and said mark is concealed when the lock is in fastening position.

9. The combination with the fuel tank of a vehicle having a fuel inlet, of an adapter fixedly secured into the inlet, a cap fitting over said adapter so as to close the passage to said inlet when in place, a lock to fasten the cap to cover said inlet passage, said cap having an opening on its outside not in communication with the inlet passage, a plate slidably held below said opening, and means to connect said plate to said lock to reciprocate said plate as said lock is opened and closed, said plate having a marking thereon so arranged as to be opposite said opening only in the position of said plate corresponding to the open position of said lock.

10. The combination with the fuel tank of a vehicle having a fuel inlet, of an adapter fixedly secured into the inlet, a cap fitting over said adapter so as to close the passage to said inlet when in place, a lock to fasten the cap to cover said inlet passage, said cap having an opening on its outside not in communication with the inlet passage, a plate slidably held below said opening, means to connect said plate to said lock to reciprocate said plate as said lock operates to fasten and unfasten said cap, said plate having a marking thereon so arranged as to be opposite said opening only in the position of said plate corresponding to the unfastening position of said lock, the inside portion of said cap beneath said plate being removably secured in place so as to allow replacement of said plate.

CHARLES K. GOLDSTEIN.